United States Patent [19]

Kiss

[11] 4,441,949

[45] Apr. 10, 1984

[54] PROCESS FOR LINING MOULDED ARTICLES AND APPARATUS FOR PERFORMING THE PROCESS

[76] Inventor: Günter H. Kiss, Gustav-Freytag-Strasse 7, D-1000 Berlin 33, Fed. Rep. of Germany

[21] Appl. No.: 409,076

[22] Filed: Aug. 18, 1982

[30] Foreign Application Priority Data

Sep. 24, 1981 [DE] Fed. Rep. of Germany ....... 3138442

[51] Int. Cl.³ .............................................. B65C 9/08
[52] U.S. Cl. ................................... 156/212; 156/216; 156/572
[58] Field of Search ............... 156/212, 216, 522, 572, 156/578

[56] References Cited

U.S. PATENT DOCUMENTS

| | | | |
|---|---|---|---|
| 2,651,429 | 9/1953 | Von Hofe | 156/572 |
| 3,147,172 | 9/1964 | Wesa et al. | 156/216 |
| 4,243,456 | 1/1981 | Cesano | 156/216 |
| 4,247,350 | 1/1981 | McIntyre et al. | 156/216 |

Primary Examiner—Edward C. Kimlin
Assistant Examiner—Timothy W. Heitbrink
Attorney, Agent, or Firm—Lee C. Robinson, Jr.

[57] ABSTRACT

A process for lining moulded articles, e.g. for the internal lining of motor vehicles, and apparatus for performing this process, are described in which a lining apparatus is supplied with blanks in alternating manner via a paired arrangement of lining moulds. When one lining mould is in the operating position for the actual lining process, the other lining mould is supplying a completed moulded article to the lower mould of a bending-over and/or punching or stamping device and receives a new blank and then supplies it to the lining apparatus. In the meantime the first-mentioned lining mould has removed again a fully lined moulded article from the lining apparatus. The bending-over process takes place between the taking over of a blank from one of the blank supports on either side of the lining apparatus and the transfer thereof, after lining, to the lower mould of the associated bending-over device.

12 Claims, 1 Drawing Figure

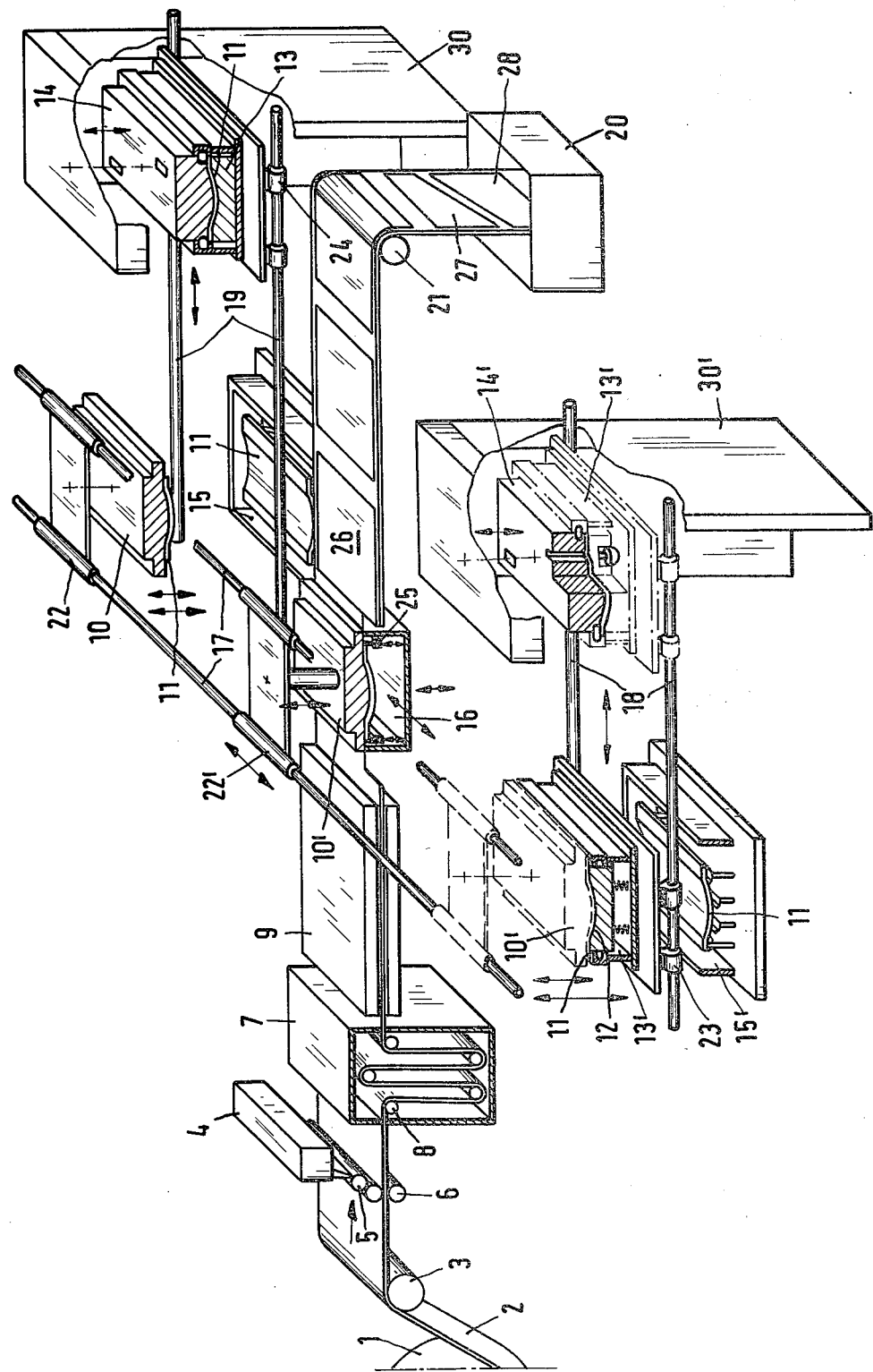

PROCESS FOR LINING MOULDED ARTICLES AND APPARATUS FOR PERFORMING THE PROCESS

The invention relates to a process for lining or coating moulded articles according to the preamble of claim 1 and to an apparatus for performing this process.

The term "lining" is generally understood to cover a process in which one or more semifinished articles are joined together by direct or indirect heat application and accompanied by pressure action, a durable connection being ensured by an intermediate layer acting as an adhesive. Known processes for producing interior linings of cars and other vehicles are based on semifinished articles, such as moulded articles made from cellulose or lignocellulose as the starting materials for the carrier layer, whilst the surface thereof which is visible within the vehicle is lined with covering materials of various types forming the so-called decorative materials.

It is known to process both thermoplastic and thermosetting plastic lining in the form of continuous products, the finished mouldings being supplied to a separate lining apparatus operating with different degrees of automation as a function of the constructional form. The lining foil removed from a delivery spool, following a gluing station, passes through a heating zone, before being joined to the moulded article in a lining press. This is generally then manually removed from the lining apparatus to undergo a manually performed bending-over process in which edge portions of the lining foil projecting above the peripheral edge of the moulded article are placed manually around said edges and, as a result of an adequate adhesive action, are pressed on to the back of the moulded article.

Apart from the not inconsiderable and therefore uneconomical manual parts of this operation, it is also disadvantageous therein that, as a result of the process, when working the endless lining foil, the lining apparatus mould must be set up for at least a given number of lining processes for a specific moulded article, e.g. the lining of the right-hand front door of a car, followed by the re-equipping, e.g. for the left-hand front door lining and so on. However, this leads to the disadvantage that the different characteristics of the lining material, which not only unavoidably occur between individual charges, but can also occur within one and the same storage reel can lead, in the case of the aforementioned example, to there being differences in the door inner linings and the back of the same vehicle as a result of minor colour shades, differences in roughness, differences in figuring and the like, which naturally should be avoided to the greatest possible extent. Another disadvantage of working with the continuous lining foil is that as a result of the aforementioned handling operations, the working sequence takes place in a largely discontinuous manner or with excessively long down times, whereby the foil preheating process must always be interrupted for the time required for removing a just-lined moulded article and for reinserting a new blank which is to be lined.

Accordingly, it is an object of the present invention to obviate this problem and provide a process suitable for producing linings in large numbers, whereby the continuity of the supply of the lining material is improved and the discontinuity of heating is largely eliminated by considerably increasing the cycle speed.

It is another object of this invention to make it possible to use the same foil quantity for an associated set of moulded articles, such as e.g. all the moulded articles for lining the interior of a car, whereby this takes place in a direct time sequence.

According to any of many possible embodiments of this invention, this problem is solved by a process including the steps of placing moulded blanks on one or more blank supports, supplying a lining foil by means of a continuous belt passing through a lining apparatus, durably securing the lining foil onto the moulded blanks by action of heat and pressure, and finishing the lined moulded blanks in a finishing means, such as a bending-over device and/or a stamping and cutting device.

The process of this invention embraces the improvement including the steps of alternately supplying the blanks to the lining apparatus from at least two sides of the continuous belt in time sequence.

This process can be carried out in apparatus comprising continuous belt means for passing the lining foil therethrough, lining means for durably securing the lining foil onto the moulded blanks by action of heat and pressure, and at least one finishing device. The apparatus includes also the improvement in which at least two lining moulds are alternately disposed to respective sides of the continuous belt to receive moulded blanks and then are disposed in turn into working engagement with the lining means whereat the lining is durably secured to the moulded blank. The at least one finishing means can include two respective finishing mould assemblies. At least a part of each of these finishing mould assemblies is displaceable to one end position thereof to receive the lined, moulded blanks from the associated one of the lining mould devices, and is displaceable to another end position thereof into an operative portion of the finishing device.

The moulded articles to be lined no longer have to be directly inserted into a fixed lining apparatus, through which the lining foil is passed in the form of a continuous belt and instead the lining apparatus is provided with a plurality, but (preferably two) lining tools or moulds, which alternately receive blanks from a plurality of spatially separated blank supports, whilst at least one lining mould within the lining apparatus performs a lining process accordingly, it is possible to eliminate virtually all the hitherto necessary lining pauses resulting from the insertion of the blank in the lining apparatus, the cutting of the lining foil from the endless belt and the removal of the lined moulded article. The cutting and braking or bending over, i.e. of the edge portion of the lining foil, and the placing of said foil round the moulded article edges takes place in the same operation single when the foil is still in the softened state due to the heating process. If desired, stamped or punched portions and holes to the lined moulded article can be applied at this same time. The sequential production of e.g. left and right-hand door sides, as well as the other moulded articles for finishing the same car, ensures absolute quality identity, which in particular includes an identical optical impression with respect to all the moulded articles in the set. In the case of the tandem arrangement chosen according to a preferred embodiment, it is possible to double the working speed. According to a general further embodiment, the tandem arrangement can be replaced by a revolving or turret arrangement for the blank supports and correspondingly the bonding-over and stamping or punching mechanisms which are then aligned e.g. radially to one another, thereby further improving the cycle speeds. The present apparatus advantageously prevents all the hitherto necessary heating interruptions.

The lining, edge cutting and bending-over of the projecting foil material take place within a single apparatus arrangement in spatially centralized manner.

Further advantages of the process of this invention, in conjunction with apparatus for carrying out the same are described hereinafter relative to an advantageous apparatus embodiment.

The sole drawing FIGURE is a diagrammatic perspective view of an embodiment of apparatus, partly in section, for carrying out the present invention.

As is apparent from the FIGURE, lining foil is supplied from a delivery spool 1 in the form of a continuous belt 2 either directly or via a chain or belt drive (not shown) in the direction of the arrow and via a feed roll 3 to a gluing device 4, in which thermally activatable adhesive is supplied from a storage means via a gluing roller 5 to a double roller arrangement 6, through which passes the continuous belt 2. Behind the gluing device 4 is connected a venting device 7, which substantially comprises a box-like closed space in which the lining foil is repeatedly reversed by means of a plurality of guide pulleys 8. Hot, dry air preferably flows over the foil, leading to the thermal activation and conditioning of the lining adhesive. The continuous belt 2 preferably comprising a thermoplastic foil material or a foam foil or the like, on leaving the venting device 7 passes through a heating device 9 forming a heating section of defined length and in which the lining foil is heated to the temperature necessary for a vacuum deep drawing process and the lining adhesive simultaneously undergoes an optimum thermal activation.

The heating device 9 is directly followed in the direction of movement of the continuous belt 2 by lining apparatus 16. The remaining residual portions of the continuous belt 2 leave the lining apparatus 6 in the represented manner and are fed to the waste receptacle 20 by means of a take-off or deflection roller 21.

In a present embodiment, lining apparatus 16 comprises a vacuum-forming apparatus and in the lowered state of a lining mould 10 or 10', which forms the male mould, forms a space closed on all sides which encloses the lining foil within it and in which by vacuum action the lining foil is firmly pressed against a blank 11 held by the male mould or lining mould 10, 10' and is durably fixed over its entire area by means of the previously applied lining adhesive. Within the lining apparatus are provided cutting devices 25 which, substantially simultaneously with the lining process, i.e. in the lowered state of the lining mould 10 or 10' cut the lining foil from the continuous belt 2 in accordance with the circumferential edge of the blank 11 and at an adequate distance from the latter. The lining apparatus 16, which is fixed and aligned with respect to the movement path of the continuous belt 2, is vertically adjustable in such a way that during the lining process it is in a raised position in which simultaneously the lining mould 10, 10' is located in a lowered, sealed position permitting vacuum forming.

In the present embodiment, two lining moulds 10, 10' are associated with the lining apparatus 16 and are suspended on a pair of guide rods 17 disposed transversely to the continuous belt 2 by means of respective guide bearings 22, 22' and are movable at right angles to the direction of the movement of continuous belt 2 so that the moulds 10, 10' can be brought, for the purpose of alternately engaging the belt 2 and then finishing the lined blank, into two end positions. In the illustrated position, the lining mould 10' is in working engagement with lining apparatus 16, i.e. aligned over the latter, and when lowered in the vertical direction the mould 10' presses the lining foil sealingly on to the apparatus, whilst simultaneously the second lining mould 10 of the double mould arrangement remains aligned over a blank support device 15.

Two such blank support devices 15 and 15' are arranged in spaced manner to the right and left of the movement path of the continuous belt 2 and are fitted in fixed sequential manner with respect to the lining apparatus 16. Each essentially comprises a box, which is open at the top and is provided with heating elements (not shown) for the preheating of the blanks 11.

Finishing devices, such as bending-over devices 30, which are optionally combined with stamping or punching devices, are positioned in spaced manner with respect to the blank support devices 15, 15', parallel to the direction of movement of the continuous belt 2 and on either side of the latter. In much the same way as guide rod 17, in each case one pair of guide rods 18, 19 are provided with associated guide bearings 23, 24 for receiving and for carrying out translational movement of the lower moulds 13, 13' for the bending-over devices 30, 30'. These rods 18, 19 are positioned above the lining apparatus 16 and the two blank support devices 15 so as to engage over the same in a manner which is not indicated here, whereby they are located in a horizontal plane to the right and left below the same and parallel to the continuous belt 2.

Apart from the lower moulds 13, 13', the bending-over and punching devices 30, 30' also comprise the upper moulds 14, 14'. Lower moulds 13, 13' can be reciprocated in translational manner between a position aligned above the blank support devices 15, 15' and a position aligned below the upper moulds 14, 14'. The latter are arranged in fixed manner within the respective bending-over devices 30, 30' and are held in the latter so that they can move vertically up and down only.

The apparatus described in the aforementioned manner functions as follows. On the basis of the represented operating position within the lining apparatus 16 and using vacuum forming, a blank 11 is provided with a lining 12 by means of the lining mould 10', said lining being cut from the continuous belt 2 by a suitable cutting device 25. Simultaneously, the lining mould 10 receives a new blank 11, which had previously been located on blank support device 15 and was correspondingly preheated. The blank is held on the lining mould 10 by vacuum suction and the moves from the lowered position in which it receives the blank into a raised position permitting insertion into the lining apparatus 16.

At the end of the lining process in the lining apparatus 16 and the edge cutting of the lining foil, the lining mould 10' is raised and the two lining moulds 10, 10' which are now in the raised position move over the guide bearings 22, 22' along the guide rods 17 into the position represented in the left-hand bottom side of the FIGURE. The lining mould 10 with the blank 11 held by suction now arrives in alignment over the lining apparatus 16, whilst the lining mould 10' passes in alignment above the blank support device 15' on to which in the meantime has been placed a new blank 11, which had been preheated during this time. Simultaneously, the lower mould 13' of the bending-over device 30' is located between the lining mould 10' which is now in the extended end position and the blank support device 15'. The lower mould 13' was previously moved out of the bending-over device 30' in the direction of the arrow along the guide rod 18. By lowering the lining mould 10' and releasing the vacuum, the lower mould 13' can receive the moulded article provided with the lining 12 in the represented manner. The lower mould 13', like the lower mould 13 on the other side of the arrangement of the continuous belt 2, is resiliently mounted in a box supported for translational displacement by guide bearings 24. When lower mould 13' has taken over the moulded article, it is moved out of the left-hand end position shown in the FIGURE into the right-hand end position aligned below the upper mould 14' of the bending-over device 30', which is then lowered, followed by the placing of the foil residue about the moulded article edge by means of a reverse-over diaphragm (not shown) arranged in the lower mould 13' and preferably as a result of compressed air action.

Immediately following the extension of the lower mould 13' of the bending-over device 30' from the aligned position between the lining mould 10' and the blank support device 15', the lining mould 10' can be lowered again until its surface comes into contact with the blank which has intermediately been placed on the blank support device 15'. Following the placing under vacuum of the lining mould 10', the latter firmly holds the blank 11 and can again be brought into the raised position. The lining process in the lining apparatus 16 by means of the lining mould 10 is now at an end and the latter can simultaneously be brought into its raised position, so that now both lining moulds 10, 10' are in their second end position, i.e. to the top right in the FIGURE. The aforementioned working process for the lining process is then repeated and for the bending-over device 30 it takes place in the manner described hereinbefore for the bending-over device 30'.

The timing of the movement sequence of lining moulds 10, 10', as well as the lower moulds 13, 13' of the bending-over device, the cutting of the edge within the lining apparatus 16 by means of the cutting device 25, the actual lining, the bending-over of the edge of the lining and the optional stamping of openings and holes in the lined moulded article within the bending-over devices takes place in synchronism to the movement advance of the continuous belt 2 through heating device 9, so that there is an optimization of the working sequence without down times and the automated, as well as manual charging of the blank support devices 15, 15' is considerably facilitated. Alternatively such an apparatus can also be operated without direct foil gluing and without a venting device, for which purpose the corresponding surfaces of the blanks are previously coated with the heat-activatable adhesive.

With regards to the actual lining apparatus 16 and cutting device 25 it is finally pointed out that in the embodiment the rectangular or square shape has been chosen for the lining portions 26 cut from the continuous belt 2. However, in accordance with the peripheral shape of the blank 11 to be lined, it is also possible to consider arbitrary shapes for the lining cutouts 26, which can be provided by different knife arrangements of the cutting device 25. For this purpose the cutting device can be constructed e.g. as a type of x-y plotter, whose "writing tip" forms the cutting blade and whose displaceability can be controlled in accordance with the peripheral shape of the blank, e.g. with the aid of a known programming device, so that there can be random or arbitrary curved configurations for the blade movement.

According to a further embodiment and in particular for the case when only a small number of different blanks is required for a large production charge, it can be advantageous to provide a plurality and at least two lining apparatuses 16 together with the cutting device 25 and in the same way as lining mould 10, whilst alternately moving into or out of the movement path of the lining foil, in order to be able to produce in a single operation, i.e. complementary lining cutouts 27, 28, which are only symbolically shown in the FIGURE to the right thereof to facilitate understanding. Due to the possible interchangeability of the arrangement of the cutting device 25, together with the lining apparatus 16 on changing from one moulded article design to another (e.g. the internal lining on different car doors) and the use of a cutting device which can be moved in programmed manner in two directions of a plane within the box of lining apparatus 16, a minimization of waste can be achieved because the lining cutouts 26 or 27, 28 can be associated with one another in such a way that the band running out of the lining device essentially only consists of very thin longitudinal strips and webs, leaving only a negligible amount of lining foil waste.

I claim:

1. In a process of the class described for lining moulded blanks on a lining foil to produce lined moulded articles, comprising the steps of supplying the moulded blanks to blank support means, supplying the lining foil on a continuous belt passing through lining apparatus, applying and durably securing the lining foil onto the moulded blanks by action of heat and pressure, and finishing the lined moulded blanks in finishing means to yield finished lined moulded articles;

the improvement wherein said lining apparatus include at least two lining mould devices alternately disposed to respective sides of said continuous belt, and said finishing means include a respective at least two finishing mould assemblies alternately disposed to respective sides of said continuous belt, at least a portion of each of said finishing mould assemblies being displaceable to receive, at one end portion thereof, the lined moulded blank from the associated one of said lining mould devices and to another end position thereof corresponding to an operative portion of the respective finishing mould assembly;

and further comprising the steps of alternately suppling said blanks to said lining apparatus from respective sides of said continuous belt in time sequence; and whereby, while one of said lining mould devices is engaging a moulded blank supported by the blank support means on one of the respective sides of the continuous belt, another lining mould device is securing another moulded blank to the lining foil.

2. In apparatus of the class described for lining moulded blanks with a lining foil to produce lined moulded articles, in which the moulded blanks are supplied to blank support means, continuous belt means passes the lining foil through the apparatus, lining means are provided for durably securing the lining foil onto the moulded blanks by action of heat and pressure, and finishing means are provided for finishing the lined moulded blanks to yield finished lined moulded articles, the improvement comprising at least two lining mould devices alternately disposed to respective sides of said continuous belt to receive a moulded blank and then disposed in turn into working engagement with said lining means whereat said lining foil is durably secured to the moulded blank; and said finishing means alternatively disposed to respective sides of said continuous belt including a respective at least two finishing mould assemblies, at least a portion of each of the latter being displaceable to receive, at one end position thereof, the lined, moulded blank from the associated one of said lining mould devices, and to another end position thereof corresponding to an operative portion of the respective finishing mould assembly whereby, while one of the said lining mould devices is engaging a moulded blank supported by the blank support means on one of the respective sides of the continuous belt, another lining moulded device is securing another moulded blank to the lining foil.

3. Apparatus according to claim 2, wherein said at least two lining mould devices include mounting means providing simultaneous translational displacement of said lining mould devices in a direction transverse to the direction of advancement of said continuous belt.

4. Apparatus according to claim 2, wherein said lining means includes means to dispose said lining mould devices alternately in alignment with said endless belt containing said lining foil, and said blank support means includes first and second blank support devices respectively disposed opposite one another transversely of said endless belt, said blank support devices each including heating means for heating said moulded blanks with said foil thereon; and wherein said at least one finishing means includes first and second bending-over devices for finishing edges of said lining foil on said moulded blanks, said first and second bending-over devices being aligned with said first and second blank support devices.

5. Apparatus according to claim 4, wherein said first and second bending-over devices each include upper and lower moulds movable relative to one another.

6. Apparatus according to claim 5, wherein said lower moulds are each movably supported for displacement from one position correspondiing to the position of the associated blank support device to receive the foil-lined moulded blanks, and to another position in which the lower mould is aligned with the upper mould of the associated bending-over device.

7. Apparatus according to claim 6, wherein said upper moulds are vertically displaceable to engage the associated lower moulds with the foil-lined moulded blanks disposed therebetween.

8. Apparatus according to claim 6, wherein said at least two lining mould devices include first and second lining moulds disposed at a fixed spacing relative to one another and means for causing reciprocal lateral movement of said first and second lining moulds at right angles to the direction of movement of said continuous belt, so that when one of said first and second lining moulds in aligned with said lining means, the other thereof is aligned with its associated blank support device and with the lower mould of the associated bending-over device when such lower mould is disposed in the one position thereof.

9. Apparatus according to claim 4, wherein said at least two lining mould devices include first and second lining moulds disposed at a fixed spacing relative to one another and means for causing reciprocal lateral movement of said first and second lining moulds at right angles to the direction of movement of said continuous belt, so that when one of said first and second lining moulds is aligned with said lining means, the other thereof is aligned with its associated blank support device.

10. Apparatus according to claim 5, in which each of said bending-over devices includes means for translationally displacing the associated lower mould between first and second working positions, the first position corresponding to the position of one of said blank support devices for transfer of a blank from the associated lining mould to the lower mould, and the second position being aligned with the associated upper mould, the latter being translationally fixed.

11. Apparatus according to claim 4, wherein said first and second lining moulds are movable, at least to a limited extent, in the vertical as well as horizontal directions, said upper moulds are displaceable in the vertical direction only, and said lower moulds are displaceable in the horizontal direction only.

12. Apparatus according to claim 2, wherein said lining means including cutting means for cutting from said foil on said continuous belt portions of the lining foil of appropriate shape to line said moulded blanks.

* * * * *